United States Patent [19]

Horsley

[11] Patent Number: 4,569,458
[45] Date of Patent: * Feb. 11, 1986

[54] MOUNTING FOR ELECTRICAL OUTLET BOX

[76] Inventor: Larry L. Horsley, 6320 Ravenwood Dr., Lithia Springs, Ga. 30057

[*] Notice: The portion of the term of this patent subsequent to Aug. 23, 2000 has been disclaimed.

[21] Appl. No.: 524,571

[22] Filed: Aug. 19, 1983

Related U.S. Application Data

[63] Continuation-in-part of Ser. No. 302,045, Sep. 14, 1981, Pat. No. 4,399,922.

[51] Int. Cl.[4] .............................................. H02G 3/08
[52] U.S. Cl. ..................................... 220/3.6; 220/3.9; 248/27.1; 248/DIG. 6
[58] Field of Search ................ 248/27.1, DIG. 6, 558; 220/3.9, 3.92, 3.3, 3.5, 3.6

[56] References Cited

U.S. PATENT DOCUMENTS

| | | | |
|---|---|---|---|
| 396,321 | 1/1889 | Baird | 248/159 X |
| 1,066,706 | 7/1913 | Caine | 248/300 X |
| 2,374,622 | 4/1945 | Rugg | 248/DIG. 6 X |
| 4,399,922 | 8/1983 | Horsley | 248/DIG. 6 X |
| 4,462,564 | 7/1984 | Alves et al. | 248/27.1 |

Primary Examiner—Ramon S. Britts
Assistant Examiner—David M. Purol
Attorney, Agent, or Firm—Newton, Hopkins & Ormsby

[57] ABSTRACT

A mounting bracket for an electrical outlet box is provided in its front panel which attaches to a wall stud with an auxiliary group of attaching screw receiving openings to enable the mounting of two standard sizes of outlet boxes and dry wall rings by means of the same bracket. The rearwardly extending right angular stabilizing extension of the mounting bracket which extends to the dry wall panel on the far side of the wall is provided with a large cable receiving opening which allows the electrician to direct an electrical cable from the outlet box in any required direction within the interior wall space. The mounting bracket is provided in three sizes to enable its use in walls of three standard thicknesses.

7 Claims, 10 Drawing Figures

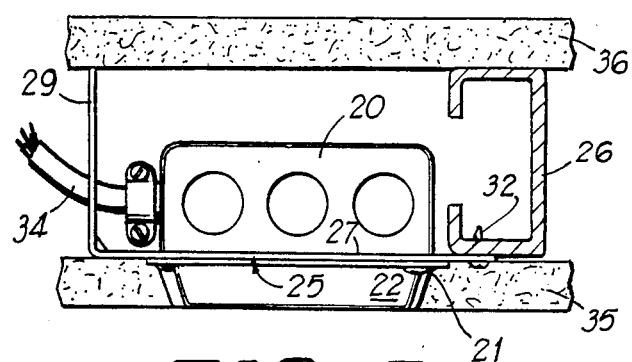 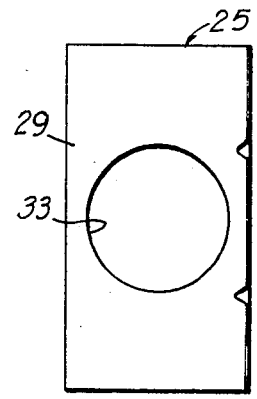
FIG 3  FIG 4
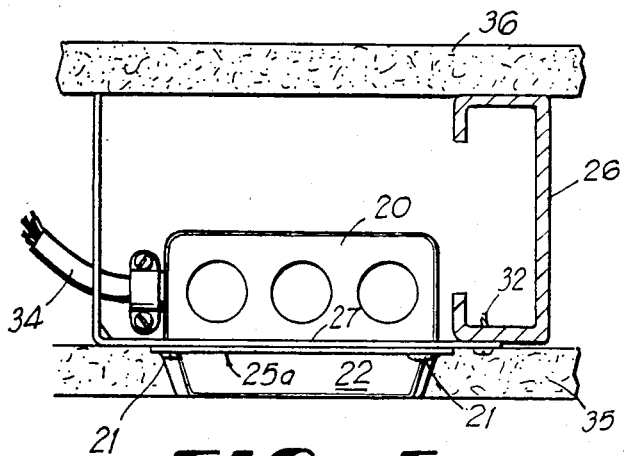 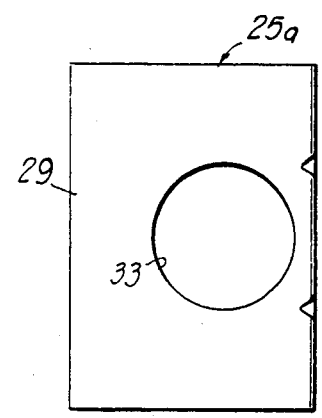
FIG 5  FIG 6
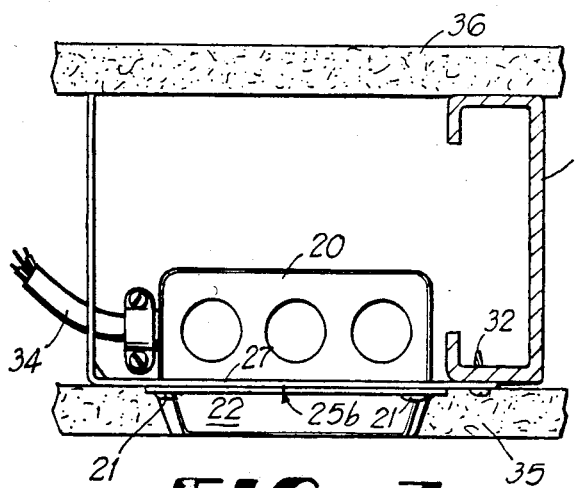 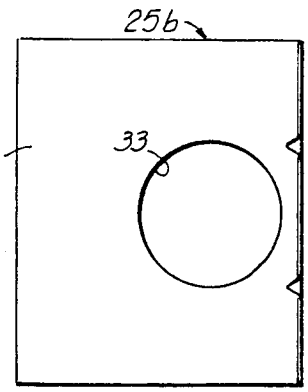
FIG 7  FIG 8

MOUNTING FOR ELECTRICAL OUTLET BOX

CROSS-REFERENCE TO RELATED APPLICATION

This application is a continuation-in-part of application Ser. Number 302,045, filed Sept. 14, 1981 for OUTLET BOX MOUNTING, now U.S. Pat. No. 4,399,922.

BACKGROUND OF THE INVENTION

The objective of the present invention is to improve on the device disclosed in the above parent application in several important respects. The prior application discloses a mounting bracket for an electrical outlet box of one standard size and also being adapted to cooperate with a dry wall ring of one standard size. The present invention improves upon this arrangement by enabling the mounting bracket to support outlet boxes and dry wall rings of two standard sizes presently in wide usage. This expanded capability is realized merely by the addition of a second set of screw receiving openings in the forward panel of the L-shaped mounting bracket.

Another major improvement over the device in the parent application is the provision in the right angular rearwardly projecting stabilizing extension of the mounting bracket of a large clearance opening to receive therethrough an electrical conduit leading from the outlet box, whereby this conduit can extend in either direction on either side of the stabilizing extension, as well as vertically in the interior wall space. This versatility of use was not possible to achieve with the mounting bracket according to the prior application, because the right angular stabilizing extension blocked passage of the electrical conduit through the extension.

In the present invention, as further improvement features over the device in the parent application, the L-shaped mounting bracket is manufactured in three sizes to enable use thereof on walls of three different conventional thicknesses. The necessity for break-away portions of the mounting bracket as in the parent application has been obviated, with a savings of metal and a simplification of packaging. The front panel of the bracket has also been sized according to the present invention to allow the installation of outlet boxes and their mounting brackets on two sides of a metal wall stud, when required.

Other features and advantages of the invention will become apparent to those skilled in the art during the course of the following detailed description.

BRIEF DESCRIPTION OF THE DRAWINGS

FIG. 3 is a plan view of the outlet box mounting, partly in section, with the mounting bracket sized for one conventional wall thickness.

FIG. 4 is a side elevation of the mounting bracket in FIG. 3.

FIGS. 5 and 6 and 7 and 8 are views similar to FIGS. 3 and 4 depicting the invention with relation to wall of two other conventional thicknesses.

DETAILED DESCRIPTION

Figure 1:
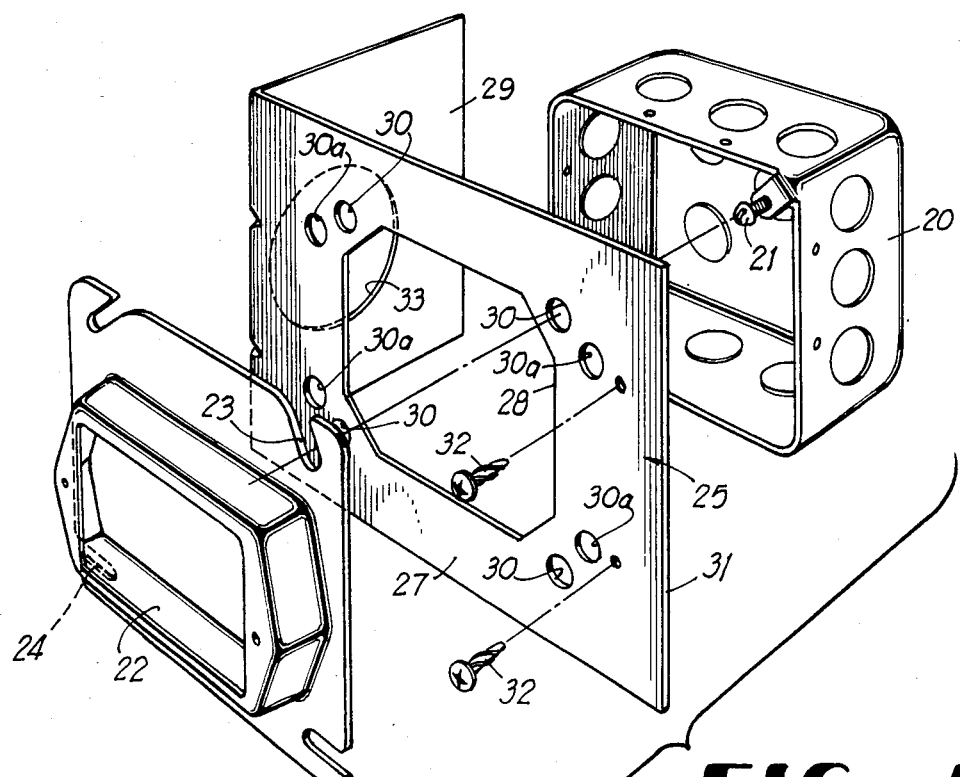
FIG. 1 is an exploded perspective view of a mounting for an electrical outlet box according to this invention.

Referring to the drawings in detail wherein like numerals designate like parts, an outlet box 20 of one standard size carries a pair of diagonally disposed corner fastening means such as mounting screws 21. A cooperating dry wall ring 22 of matching size has cooperating fastening means receiving openings such as corner slots 23 and 24 to receive the shanks of screws 21 prior to their tightening, as disclosed in the referenced parent application.

An L-shaped mounting bracket 25 for supporting the outlet box 20 and dry wall ring 22 on a metal wall stud 26 includes a front panel 27 having a main opening 28 to register with the open side of the outlet box 20, and a rearwardly extending right angular stabilizing extension or flange 29, substantially as disclosed in the parent application. In accordance with a feature of this invention, the front panel 27 of bracket 25 is provided near its four corners with two separate groups of access openings such as apertures 30 and 30a, there being four apertures in each group, as shown. The apertures in both groups are sized to allow passage therethrough of the shanks of outlet box mounting screws, such as the screws 21, prior to tightening the screws to complete the joining of the box and dry wall ring to the mounting bracket. More particularly, the apertures 30 are spaced and aligned to receive the screws 21 of the standard size box 20, such screws 21 also properly engaging the dry wall ring 22 of a matching size, as shown in FIG. 2.

Figure 2:
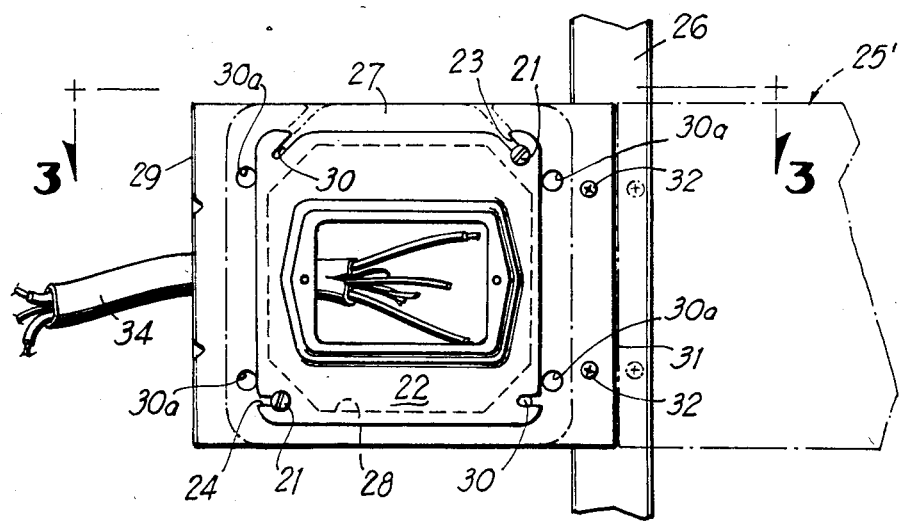
FIG. 2 is a front elevation of the mounting.

The second group of apertures 30a which are more widely spaced than the apertures 30 can receive the mounting screws of a larger standard size outlet box, not shown, and the screws 21 of such larger outlet box are received in the corner slots of a similarly larger standard size dry wall ring 22a shown in phantom lines in FIG. 2. Thus, the mounting bracket 25 possesses increased utility and versatility compared to the mounting bracket in the parent application by virtue of the provision of a second set of screw-receiving apertures in its forward panel 27.

Additionally, the forward panel 27 has been foreshortened somewhat in comparison to the prior art whereby its vertical edge 31 can be positioned at the transverse center of a stud 26 and anchored thereto by a pair of screws 32 via apertures 32' in panel 27. In the parent application, the longer panel 27 overlapped the entire front face of the stud 26, whereby only one outlet box could be attached to the stud at one elevation. The present invention enables the attachment of two outlet boxes to the stud 26, one on each side of the same and at one elevation, the second box mounting bracket 25' being indicated in phantom lines in FIG. 2.

In accordance with another feature of the present invention, the right angular stabilizing extension 29 of mounting bracket 25 is provided with a relatively large, preferably 2" diameter circular opening 33, not provided in the prior art. This large opening allows the electrical cable or conduit 34 extending from the outlet box 20 to be routed on either side of the extension 29 and through the extension, as shown in FIGS. 3, 5 and 7. The cable 34 can be routed to the left or to the right of the extension 29, upwardly or downwardly within the wall, or in substantially any required direction. In the prior art, the cable could not extend through the non-apertured bracket extension 29. This is an important advantage of the present invention.

With reference to FIGS. 3-4, 5-6, and 7-8, it can be observed that the mounting bracket is provided in three sizes to enable placement of the bracket in walls having three standard thicknesses between their opposite side dry wall panels 35 and 36. The three sizes of mounting brackets for this purpose are designated 25, 25a and 25b, FIGS. 4, 6 and 8. The only difference among the three brackets is that their stabilizing extensions 29 are formed progressively shorter to extend properly between the dry wall panels 35 and 36 of walls having three thicknesses, as stated. This arrangement has been found to be more convenient, more economical and more practical than the provision of a mounting bracket of one size with break-away portions on the extension 29 enabling the bracket to be used on walls of all standard thicknesses. A savings of metal is effected in manufacturing the bracket in three sizes according to the present invention.

It should now be apparent that the present invention materially increases the utility and the versatility of the outlet box mounting in several different ways compared to the prior art. Two standard sizes of outlet boxes and dry wall rings can be accommodated by the mounting bracket 25. The electrical cable 34 can be routed in any direction within the wall space by virtue of the provision of the opening 33. The mounting can be made conveniently and with economy and a minimum of labor on walls of three standard thicknesses. Two outlet boxes can be attached to a single stud 26 at one elevation. All of these advantages are obtained without sacrifice of any of the novel features of the mounting as disclosed in the parent application.

Figure 9:
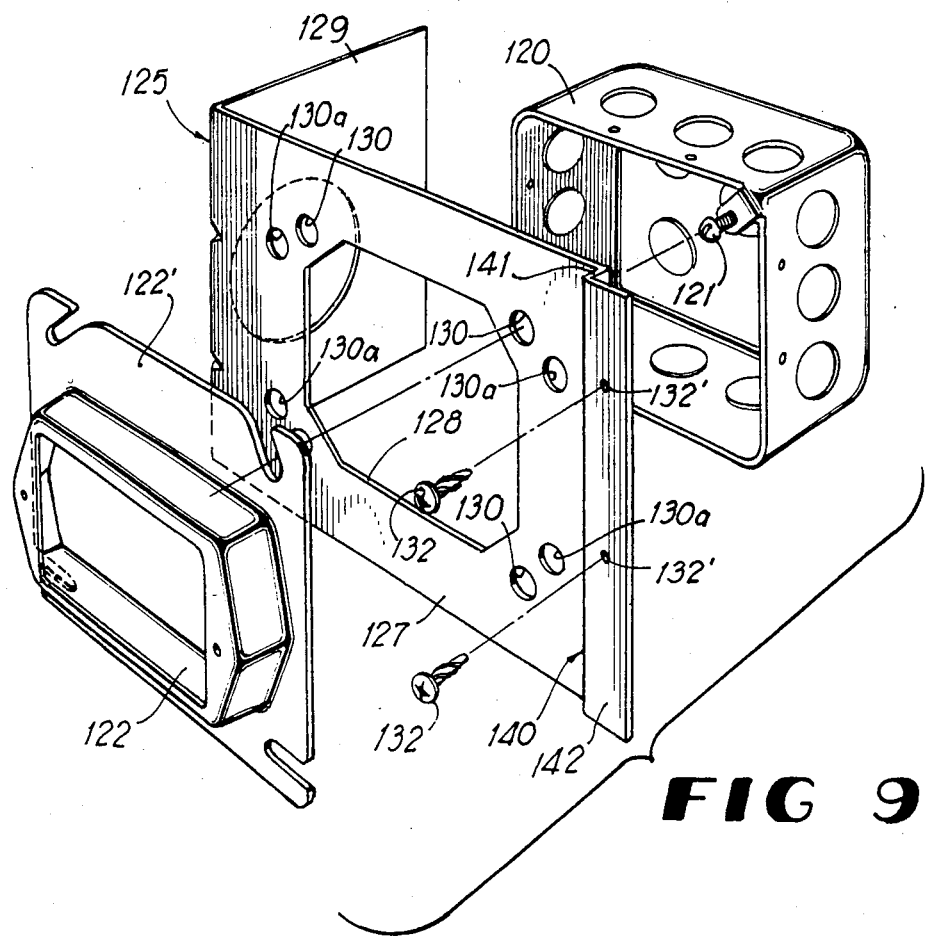
FIG. 9 is an exploded perspective view of an alternate embodiment of a mounting for an electrical mounting box.
Figure 10:
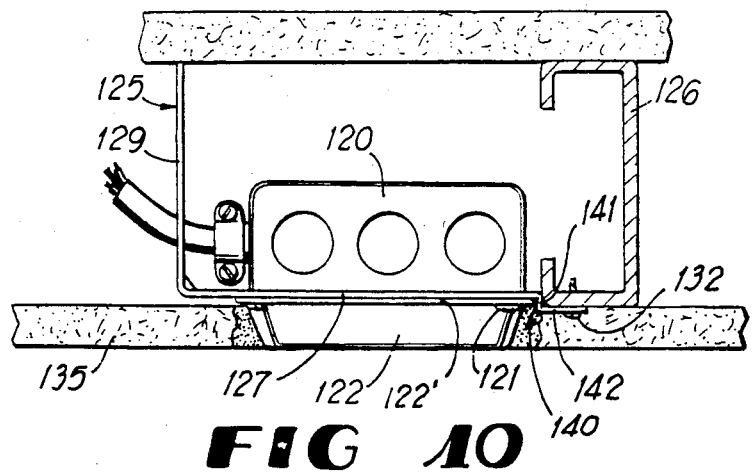
FIG. 10 is a plan view of the outlet box mounting, shown in FIG. 9, partly in section, with the mounting bracket sized for one conventional wall thickness.

A further embodiment of my present electrical outlet box is shown in FIGS. 9 and 10, wherein a generally L-shaped mounting bracket 125 for supporting the outlet box 120 and dry wall ring 122 on a metal wall stud 126 includes a front panel 127 having a main opening 128 to register with the open side of the outlet box 120, and a rearwardly extending right angular stabilizing extension of flange 129, substantially as disclosed in the preceding embodiment. In accordance with a feature of this further embodiment of the invention, the front panel 127 of bracket 125 is provided near its four corners with two separate groups of access openings such as apertures 130 and 130a, there being four apertures in each group, as shown. The apertures in both groups are sized to allow passage therethrough of the shanks of fastener means such as outlet box mounting screws, such as the screws 121, prior to tightening the screws to complete the joining of the box and dry wall ring to the mounting bracket. More particularly, the apertures 130 are spaced and aligned to receive the screws 121 of the standard size box 120, such screws 121 also properly engaging the dry wall ring 122 of a matching size, in the same fashion as described in FIGS. 1-8 of the first embodiment.

The second group of apertures 130a which are more widely spaced than the apertures 130 can receive the mounting screws of a larger standard size outlet box, as previously described in the first embodiment.

Panel 127 is provided with an offset 140 adjacent its distal end by right angular panel portion 141 which terminates in a right angular mounting flange 142 which is displaced forwardly of and in a parallel plane with mounting surface 127 on the mounting 125. This flange 142 is provided with apertures 132' to receive mounting screws 132 for securing the mounting flange 142 to a stud 126.

As can be seen more clearly in FIG. 10, the offset 140 (which is approximately 3/16") is provided to accommodate for the thickness of the peripheral portion of the mounting face plate 122' on the dry wall ring 122.

This arrangement including the distal mounting flange 142 allows the peripheral portion of the dry wall ring 122 to lie flat across the dry wall panel 135 while still abutting the front panel 127 in a sandwich-like manner. This arrangement eliminates the necessity for cutting the inside surface of the dry wall panel 135 to receive therein the peripheral portion of the dry wall ring 122.

It is to be understood that the form of the invention herewith shown and described is to be taken as a preferred example of the same, and that various changes in the shape, size and arrangement of parts may be restored to, without departing from the spirit of the invention or scope of the subjoined claims.

I claim:

1. A mounting for supporting electrical outlet boxes of at least two sizes comprising an L-shaped mounting bracket for attachment to a wall stud and having a front wall containing a central opening to register with the open side of an outlet box, said front wall having at least two groups of four access openings located outwardly of said central opening and all being of a size to receive therethrough the shanks of outlet box mounting screws, the access openings of one of said groups being more widely spaced than the access openings of the other of said groups, whereby outlet boxes of at least two different sizes are mountable upon the front wall of the L-shaped mounting bracket in conjunction with dry wall rings of two comparable sizes, and the mounting bracket including a substantially right angular rearwardly projecting stabilizing extension.

2. A mounting for electrical outlet boxes as defined in claim 1, said front wall being provided with an offset adjacent its distal end by a right angular panel portion which terminates in a right angular mounting flange which is displaced forwardly of and in a parallel plane with said front wall for mounting on a vertical wall stud, thereby allowing the peripheral portion of the dry wall ring to be flat across a dry wall panel while still abutting said front panel in a sandwich-like manner.

3. A mounting for electrical outlet boxes as defined in claim 1, whereby the stabilizing extension includes an opening formed therethrough for the passage of an electrical cable.

4. In an outlet box mounting arrangement, a substantially L-shaped mounting bracket having a front wall provided with spaced openings along one vertical edge to facilitate attaching the bracket to a vertical wall stud with the bracket extending beyond one side of the stud, the bracket front wall having a large central opening adapted to register with the open side of an electrical outlet box disposed behind the bracket front wall and carrying at least a pair of diagonally spaced outlet box mounting screws, the bracket front wall having at least two pairs of diagonally spaced access openings of sufficient size to receive the shanks of the outlet box mounting screws, one diagonal pair of access openings being spaced a first distance to receive the mounting screws of an outlet box of a first size, and the access openings of the other pair being spaced a second distance to receive mounting screws of an outlet box of a second size, and the mounting bracket including a rearwardly projecting size extension remote from said vertical edge of the bracket front wall and serving to stablize the mounting bracket between a pair of spaced wall panels.

5. In an outlet box mounting arrangement as defined in claim 4, said mounting bracket having the capacity to register with at least two sizes of dry wall rings matching the outlet box sizes and having corner slots adapted to engage the shanks of the outlet box mounting screws.

6. In an outlet box arrangement, as defined in claim 4, whereby said side extension includes an opening formed therethrough for the passage of an electrical cable.

7. An outlet box mounting assembly having an outlet box, selected from at least two different sized outlet boxes, and a dry wall ring, said outlet box having a front opening and fastening means receiving holes adjacent to said front opening, said dry wall ring having a central opening to be aligned with said front opening, and fastening means receiving openings therein for alignment with the fastening means receiving holes of said outlet box wherein the improvement comprises:

L-shaped mounting bracket having a flat front wall provided with a central opening and a plurality of pairs of access openings in said wall outwardly of said central opening, said wall being disposed between said outlet box and said dry wall ring with certain of said access holes aligned respectively with the fastening means receiving holes of said outlet box and said fastening means receiving openings of said dry wall ring, and fastening means respectively passing through said fastening means receiving openings of said dry wall ring and thence through certain of the access openings in said wall and thence into said fastening means receiving holes of said outlet box for securing said dry wall ring and said wall and outlet box together when one size box is selected as said outlet box, said fastening means passing through certain other of said access openings when the other size outlet box is selected as said outlet box.

* * * * *